March 13, 1934.  N. B. GREEN  1,950,884
SELF ERECTING FRONT CAMERA LATCH
Filed Dec. 12, 1932  2 Sheets-Sheet 1
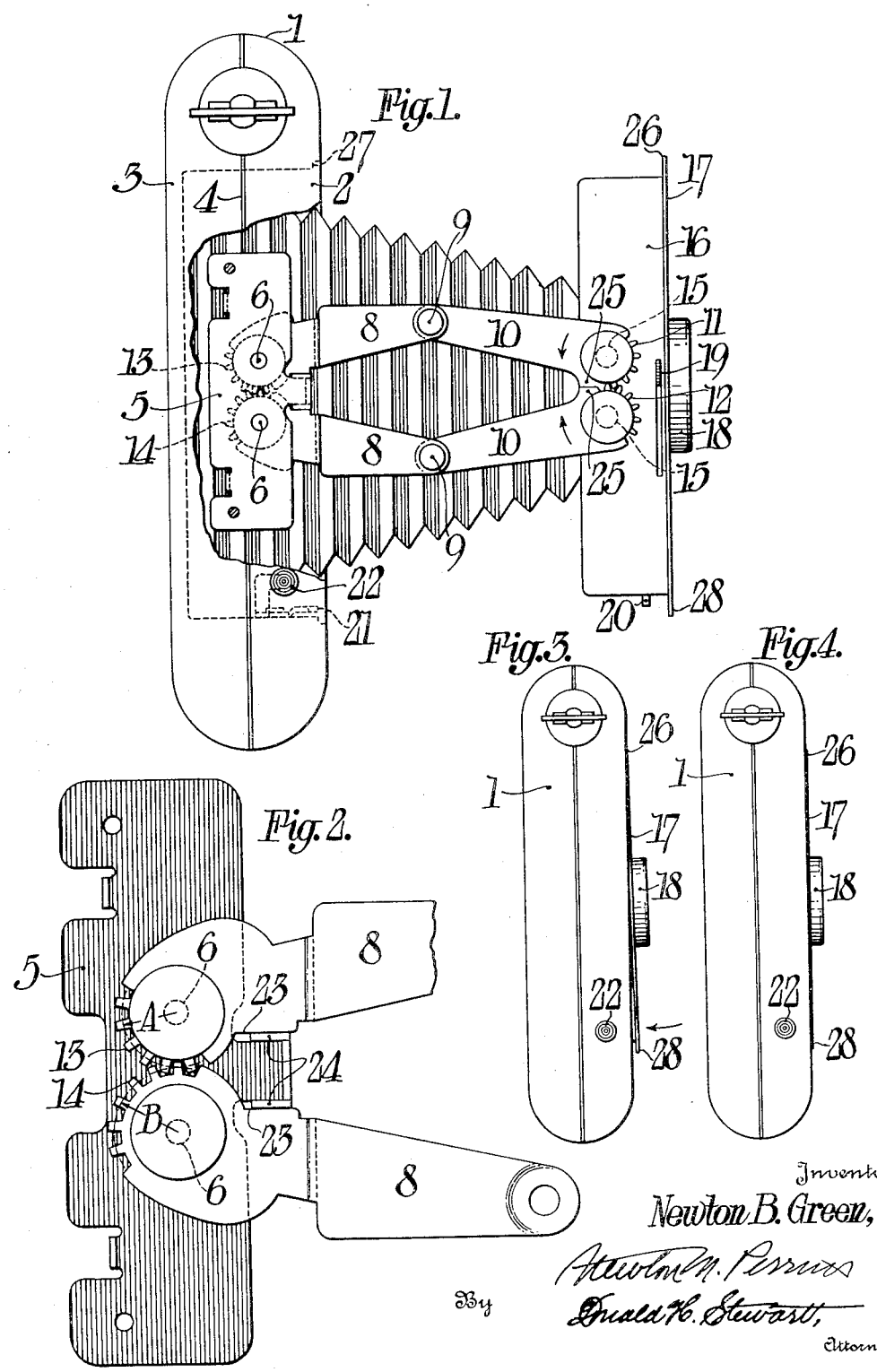
Inventor:
Newton B. Green, March 13, 1934.  N. B. GREEN  1,950,884
SELF ERECTING FRONT CAMERA LATCH
Filed Dec. 12, 1932  2 Sheets-Sheet 2
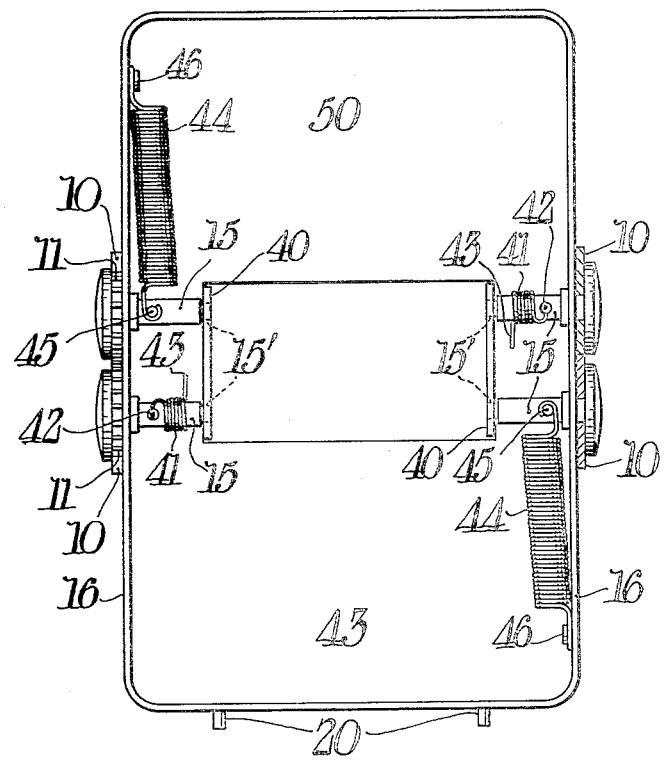
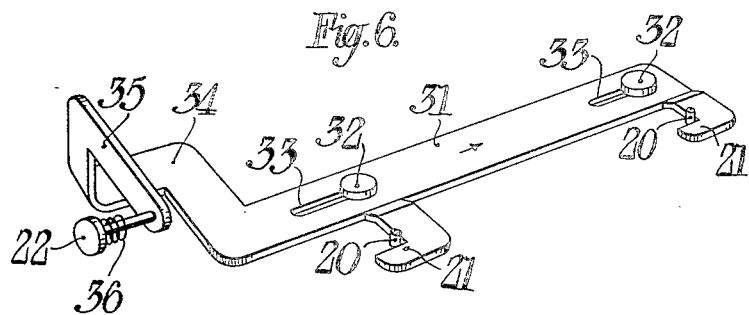
Inventor:
Newton B. Green, Patented Mar. 13, 1934

1,950,884

UNITED STATES PATENT OFFICE 1,950,884

SELF-ERECTING FRONT CAMERA LATCH

Newton B. Green, Rochester, N. Y., assignor to Eastman Kodak Company, Rochester, N. Y., a corporation of New York Application December 12, 1932, Serial No. 646,808

10 Claims. (Cl. 95—39)

This invention relates to photography and more particularly to photographic cameras. One object of my invention is to provide a photographic camera of the type having a camera front normally thrust toward an opened position and having a latch for restraining the movement of the front in a closed position. Another object of my invention is to provide such a camera in which means is provided for retaining the front in a closed position by the latch and in an accurate arrangement with the camera body. Another object of my invention is to provide a camera with a front which is normally projected from the body but which may be held against the body by means of a latch member which operates only at one end of the front and to provide means for compensating for the thrust on both ends of the camera front so that the front will lie parallel to the camera body both when in a closed position and when in an opened position. Still another object of my invention is to provide a camera with a front supported on a pair of hinged side braces, the hinged side braces being intergeared in such a manner that as the front moves to or from the camera body its angular relation thereto will be altered. Still another object of my invention is to provide a front which may be moved relative to the body by means of intergeared hinged side arms in such a manner that the side of the front which carries a latch moves more slowly towards the camera body than the opposite side so that when latched the entire front will lie parallel with the camera body and other objects will appear from the following specification, the novel features being particularly pointed out in the claims at the end thereof.

In cameras of the type in which a spring constantly exerts a thrust on the camera front causing the camera front to move into an opened or picture-taking position, it is difficult to provide a satisfactory latch because the inter-engaging latch members have to fit very securely in order to prevent the camera from being accidentally unlatched and in order to take up for the lost motion which almost always occurs with formed-up metal parts.

It has usually been necessary in order to firmly hold the front of such cameras against the body to provide latch members at both ends of the front although this type of latch, in addition to the expense of such a latch, has a number of disadvantages.

I have overcome the usual disadvantages in latching the front of spring operated cameras to the body by causing the front to move from its parallel relation to the body when extended to a position in which it lies slightly out of parallel as the front is folded against the body. This causes one end of the camera front to strike the body and the opposite end may be rocked about the point of contact as a fulcrum until the latching members cooperate, thus securely latching the parts together against the lost motion of the front support.

Coming now to the drawings wherein like reference characters denote like parts throughout;

Fig. 1 is a side elevation of a camera constructed in accordance with and embodying a preferred form of my invention;

Fig. 2 is an enlarged view of the inner ends of the intergeared front supporting arms;

Fig. 3 is a side elevation of the camera shown in Fig. 1 closed but not yet latched;

Fig. 4 is a side elevation of the camera shown in Fig. 3 after the latching members are brought into a cooperative relation;

Fig. 5 is a plan view of the front of the camera with the cover plate removed, and Fig. 6 is an enlarged detail perspective view showing parts of the camera front latching mechanism.

As a typical example of my invention the camera may consist of a camera body designated broadly as 1, consisting of two parts 2 and 3 which may be separated through a line drawn through the middle of the camera and indicated at 4 for loading the camera in the usual manner. The camera body 1 supports a pair of side plates 5 to which are pivoted at 6 the ends of the hinged supporting arms 8, these arms being hinged at 9 to arm sections 10 which in turn are provided with intermeshing gear segments 11 and 12.

The rear arms 8 are also provided with intermeshing gear sections 13 and 14.

The front arms 10 are pivotally supported by the shafts 15 which pass into the housing 16 of the camera front 17. This camera front may carry the usual objective support 18 and the usual trigger 19.

The front also supports a latch member in the form of a pin 20 which is adapted to engage with a cooperating latch member 21 which may be moved transversely of the camera body 1 by means of a push button 22.

Referring particularly to Fig. 2 it should be noted that the arm sections 8, which as above explained are pivoted on the shafts 6 to the plate 5, are provided with sets of intermeshing gear teeth 13 and 14.

In order to cause the camera front 17 to move from its parallel position with respect to the body as shown in Fig. 1 to a position slightly out of parallel with the camera body as shown in Fig. 3, I provide different pitch diameters for the gear teeth segments 13 and 14 and a similar difference in the pitch diameters of the gear teeth 11 and 12.

Referring to Fig. 2 the pitch diameter A may be slightly less than the pitch diameter B. The exact difference which is required may differ with the style and size of the camera under consideration but I find, as entirely satisfactory for a camera of the 2¼ x 3¼" size exposure area, that approximately 1/32" difference between the pitch diameter of A and B would be the equivalent of the difference of one tooth in a gear of that size and that such a difference will cause the camera front to strike the camera body at one end while the opposite end is a slight distance from the camera front, say 1/16".

The arms 8 are provided with flat surfaces 23 which strike the turned-up flanges 24 and thus limit the motion of these arms toward each other.

The arms 10 are provided with flat surfaces 25 which limit the motion of these arms towards each other as the arms are moved in the direction shown by the arrows in Fig. 1 by springs contained in the housing 16 and acting on the shafts 15. For the specific construction of the springs for driving these shafts, see application of John Christie, Serial No. 646,779 filed December 12, 1932. This application also shows in detail the latch indicated in this specification by the cooperating parts 20, 21 and 22.

As shown in the above mentioned application the latch for holding the camera front in a closed position consists of pins 20 carried by the camera front 16, these pins being adapted to engage the hooks 21 which are carried by the camera body. As best shown in Fig. 6 the hooks 21 are carried by a slidably mounted plate 31 this plate having slots 33 which engage and slide upon the headed studs 32 which are carried on the inside of the camera body. The plate 31 is bent at 34 and an arm 35 extends upwardly and outwardly to receive the push button 22 by which the latch may be operated. A spring 36 encircles the push button lying between the push button and the camera wall 2 in such a way that the latch members are normally held in the position shown in Fig. 6 in which they engage the pins 20 but are capable of being moved from this position by thrusting in upon the push button 22, thus compressing the spring 36 and moving the plate 31 in the direction shown by the arrow to release the pins 20.

As also shown in the application above referred to the camera front is automatically moved outwardly when the latch 20—21 is released by a series of springs, these springs being best shown in Fig. 5. In this view it will be seen that the shafts 15 which support the arms 10 are journaled in the housing 16 by passing through the outer walls of this housing and extending into bearings 15' in the upwardly extending plates 40 carried by the housing 16. Two of the four shafts 15 have a tendency to turn due to the springs 44 which are attached to pins 45 carried by these shafts and two studs 46 carried by the housing 16. These springs normally tend to turn two of the shafts 15. The other two of the shafts 15 are encircled by springs 41, each of these springs having one end 42 anchored on the shaft and the other end 43 resting against the rear housing wall 50. Thus there is a normal tendency for the shafts 15 to turn in a direction to cause the front to open and to cause the links to turn in the direction shown by the arrows in Fig. 1. These springs are under compression when the camera front is closed so that it is only necessary to release the push button 22 to release the latch 20—21 and permit the springs to move the camera front to the operative position shown in Fig. 1.

It is to be understood that the specific form of latch arrangement and the specific arrangement of the camera operating springs are not in themselves a part of the present invention but are claimed in the separate application above referred to. When the camera front 17 is folded, the position shown in Fig. 3 is reached in which the upper edge 26 of the front strikes the seat 27, best shown in Fig. 1. The opposite end of the camera front 28, because of the gear differences above mentioned, may project from the camera body a slight distance in this position. However, the latching members 20, 21 are not yet in engagement. By applying pressure in the direction shown by the arrow, Fig. 3, to the end 28 of the camera front the lost motion occurring in the arms 8 and 10 and in the gears 11, 12, 13 and 14 is all taken up and the latch members 20 and 21 may be firmly engaged. This immediately causes the camera front 17 to assume a position which is parallel to the camera body as indicated in Fig. 4.

In order to open the camera the push button 22 may be depressed releasing the cooperating latch knobs 20 and 21 and permitting the camera to fly out into its opened or picture-taking position as shown in Fig. 1.

The advantages of such a construction are quite obvious. Ordinarily where the camera moves into the camera body on lazy tongs or hinged arms in such a manner that the front is at all times parallel to the camera body when the camera is closed the front may not fit with great exactness into the camera body and consequently if a latch is provided for holding these parts together either on one or on both sides of the camera front there is always a certain amount of play due to lost motion in the interengaging parts and due to manufacturing variations in the parts. Where such a camera is provided with a spring opening means it is very difficult to keep the latches sufficiently tight to hold the front in a closed position. Normally the play of such cameras permits a sudden jar to cause the latch to release the front so that the front will spring to an opened position.

However, by placing the hinged or other movable parts under tension when the camera is latched so that any play in these parts will be taken up the camera front is not only latched more firmly in position but the front will lie perfectly parallel to the camera body.

It should also be noted that where the difference in pitch diameters of the gears is so slight that to the eye of the average observer the camera parts appear perfectly symmetrical and are not displeasing. It has also been found that it is much easier to acquire the habit of pressing the front in one spot or at one end to cause the latch to function than it is to press the entire front to cause two or more latch elements to function.

It is obvious that numerous changes can be made in my invention without departing from the spirit of it and I contemplate as within the scope of my invention all such forms as may come within the scope of the appended claims.

What I claim is:

1. In a self erecting front camera, the combination with a body, of a camera front, movable legs adapted to support said front in spaced relation to said body and parallel thereto, and means included in the legs adapted to move the front from a parallel relation to the body as said front is moved towards said body.

2. In a self erecting front camera, the combination with a body, of a camera front, movable legs adapted to support said front in spaced relation to said body and parallel thereto, and means included in the legs adapted to move the front from a parallel relation to the body as said front is moved towards said body, said means including connections between said legs.

3. In a self erecting front camera, the combination with a body, of a camera front, movable legs adapted to support said front in spaced relation to said body and parallel thereto, and means included in the legs adapted to move the front from a parallel relation to the body as said front is moved towards said body, said means including gear segments connecting said legs, said gear segments having different pitch diameters.

4. In a self erecting front camera, the combination with a body, of a camera front, movable legs adapted to support said front, in spaced relation to said body and parallel thereto, and means included in the legs adapted to move the front from a parallel relation to the body as said front is moved towards said body, said means including meshing gear segments carried by said legs, one gear segment having a different number of teeth from the other gear segment.

5. In a self erecting front camera, the combination with a body of a camera front, movable legs adapted to support said front, in spaced relation to said body and parallel thereto, and means included in the legs adapted to move the front from a parallel relation to the body as said front is moved towards said body, said means including meshing gear segments carried by the legs, some of said gear segments having one more tooth than the other gear segments.

6. In a self erecting front camera, the combination with a body, of a camera front, movable legs adapted to support said front in spaced relation to said body and parallel thereto, and means included in the legs adapted to move the front from a parallel relation to the body as said front is moved towards said body, and a latch for engaging that part of the camera front which is slightly spaced from the camera body when said front is moved on said legs into said body.

7. In a self erecting front camera, the combination with a body, of a camera front, movable legs adapted to support said front in spaced relation to said body and parallel thereto, and means included in the legs adapted to move the front from a parallel relation to the body as said front is moved towards said body, and a latch for engaging that part of the camera front which is slightly spaced from the camera body when said front is moved on said legs into said body, said latch being adapted to engage said front only when said front is sprung into parallel relation to said body.

8. In a self erecting front camera, the combination with a body, of a camera front, movable legs adapted to support said front in spaced relation to said body and parallel thereto, and means included in the legs adapted to move the front from a parallel relation to the body as said front is moved towards said body, and a latch for engaging that part of the camera front which is slightly spaced from the camera body when said front is moved on said legs into said body, said latch being adapted to engage said front only when said front is sprung into parallel relation to said body against the normal action of said legs.

9. In a self erecting front camera, the combination with a body, of a camera front, legs on which said front is adapted to move relative to said body, springs attached to said legs and adapted to project the camera front from the body and into a picture taking position, means included in the legs for moving the front slightly from a parallel relation to the body as the front is moved toward said body, and cooperating latch elements on the camera body and front adapted to be engaged by springing the front towards a parallel position with respect to the camera as said front is moved against said camera body.

10. In a self erecting front camera, the combination with a body, of a camera front, legs on which said front is adapted to move relative to said body, springs attached to said legs and adapted to project the camera front from the body and into a picture taking position, means included in the legs for moving the front slightly from a parallel relation to the body as the front is moved toward said body, a stop on the body against which one end of the camera front is adapted to rest, cooperating latch elements on the camera and front opposite to the stop, said latch elements being engageable by springing said front upon said stop until said front is substantially parallel to said camera body.

NEWTON B GREEN.